United States Patent
Sohn et al.

(10) Patent No.: US 10,319,959 B2
(45) Date of Patent: Jun. 11, 2019

(54) FLEXIBLE SECONDARY BATTERY

(71) Applicant: SAMSUNG SDI CO., LTD., Yongin-si, Gyeonggi-do (KR)

(72) Inventors: Ju-Hee Sohn, Yongin-si (KR); Naum Feygenson, Yongin-si (KR); Jun-Won Suh, Yongin-si (KR); Jeong-Doo Yi, Yongin-si (KR); Hyun-Hwa Song, Yongin-si (KR); Bong-Kyoung Park, Yongin-si (KR); Hye-Jung Lee, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 558 days.

(21) Appl. No.: 14/677,296

(22) Filed: Apr. 2, 2015

(65) Prior Publication Data
US 2015/0325820 A1 Nov. 12, 2015

(30) Foreign Application Priority Data
May 9, 2014 (KR) .................. 10-2014-0055747

(51) Int. Cl.
*H01M 2/04* (2006.01)
*H01M 2/02* (2006.01)
*H01M 2/08* (2006.01)

(52) U.S. Cl.
CPC ......... *H01M 2/0404* (2013.01); *H01M 2/021* (2013.01); *H01M 2/0202* (2013.01); *H01M 2/0217* (2013.01); *H01M 2/0478* (2013.01); *H01M 2/08* (2013.01); *H01M 2/0275* (2013.01); *H01M 2/0287* (2013.01); *H01M 2002/0205* (2013.01); *H01M 2220/30* (2013.01)

(58) Field of Classification Search
CPC .... H01M 2/0478; H01M 2/08; H01M 2/0404; H01M 2/0202; H01M 220/30
See application file for complete search history.

(56) References Cited

U.S. PATENT DOCUMENTS

| | | | |
|---|---|---|---|
| 3,964,932 A | 6/1976 | Oltman et al. | |
| 7,105,248 B2 * | 9/2006 | Yageta .................. | H01M 2/021 429/156 |
| 7,410,724 B2 * | 8/2008 | Yageta .................. | H01M 2/021 429/133 |
| 2006/0269831 A1 * | 11/2006 | Kim ...................... | H01M 2/021 429/62 |
| 2008/0102364 A1 * | 5/2008 | Uh ...................... | H01M 2/0202 429/163 |

FOREIGN PATENT DOCUMENTS

| | | | |
|---|---|---|---|
| JP | 2000-173559 | 6/2000 | |
| JP | 2007-018917 | * 1/2007 | ............ H01M 10/04 |
| KR | 10-2006-0087185 A | 8/2006 | |
| KR | 10-2009-0084178 A | 8/2009 | |

* cited by examiner

*Primary Examiner* — Osei K Amponsah
(74) *Attorney, Agent, or Firm* — Lee & Morse, P.C.

(57) ABSTRACT

A flexible secondary battery includes an electrode assembly, a first external cover that is located on a first surface of the electrode assembly, and a second external cover that is located on a second surface of the electrode assembly, the second external cover and the first external cover including a sealing portion where edges of the first external cover and the second external cover are attached to each other to seal the electrode assembly. At least one of the first external cover and the second external cover includes a stress-relief pattern in a center portion.

16 Claims, 3 Drawing Sheets

FLEXIBLE SECONDARY BATTERY

CROSS-REFERENCE TO RELATED APPLICATION

Korean Patent Application No. 10-2014-0055747, filed on May 9, 2014, in the Korean Intellectual Property Office, and entitled: "Flexible Secondary Battery," is incorporated by reference herein in its entirety.

BACKGROUND

1. Field

One or more embodiments relate to a flexible secondary battery.

2. Description of the Related Art

Unlike primary batteries which may not be recharged, secondary batteries may be used after repeated charging and discharging. Thus secondary batteries are economical and environment-friendly. Types of electronic devices including secondary batteries have diversified recently, and design-related elements of the electronic devices have become a factor when deciding to purchase electronic devices.

SUMMARY

Embodiments are directed to a flexible secondary battery including an electrode assembly, a first external cover that is located on a first surface of the electrode assembly, and a second external cover that is located on a second surface of the electrode assembly, the second external cover and the first external cover including a sealing portion where edges of the first external cover and the second external cover are attached to each other to seal the electrode assembly. At least one of the first external cover and the second external cover includes a stress-relief pattern in a center portion.

The center portion may be spaced apart from the sealing portion.

A shape of the stress-relief pattern may change when the flexible secondary battery is bent.

The sealing portion may be flat.

The first external cover may be concavely bendable. The stress relief pattern may be located in the center portion of the first external cover.

The stress-relief pattern may include patterns in a direction perpendicular to a length direction of the flexible secondary battery.

At least one of the first external cover and the second external cover may further include patterns on at least one side of the stress-relief pattern in the length direction of the flexible secondary battery.

The stress-relief pattern may be located in an xy-plane that is perpendicular to a z-axis toward which the flexible secondary battery is bendable.

The stress-relief pattern may include irregular patterns.

Embodiments are also directed to a flexible secondary battery including an electrode assembly, a first external cover that is located on a first surface of the electrode assembly, a second external cover that is located on a second surface of the electrode assembly, the second external cover and the first external cover including a sealing portion where edges of the first external cover and the second external cover are attached to each other to seal the electrode assembly, the sealing portion being flat. The first external cover may include a stress-relief pattern in a center portion thereof.

The center portion may be spaced apart from the sealing portion.

A shape of the stress relief pattern may be changeable when the flexible secondary battery is bent.

The stress-relief pattern may include patterns formed in a direction perpendicular to a length direction of the flexible secondary battery.

The first external cover may further include patterns on at least one side of the stress relief pattern in the length direction of the flexible secondary battery.

The stress-relief pattern may be located in an xy-plane that is perpendicular to a z-axis toward which the flexible secondary battery is bendable.

The stress-relief pattern may include irregular patterns.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
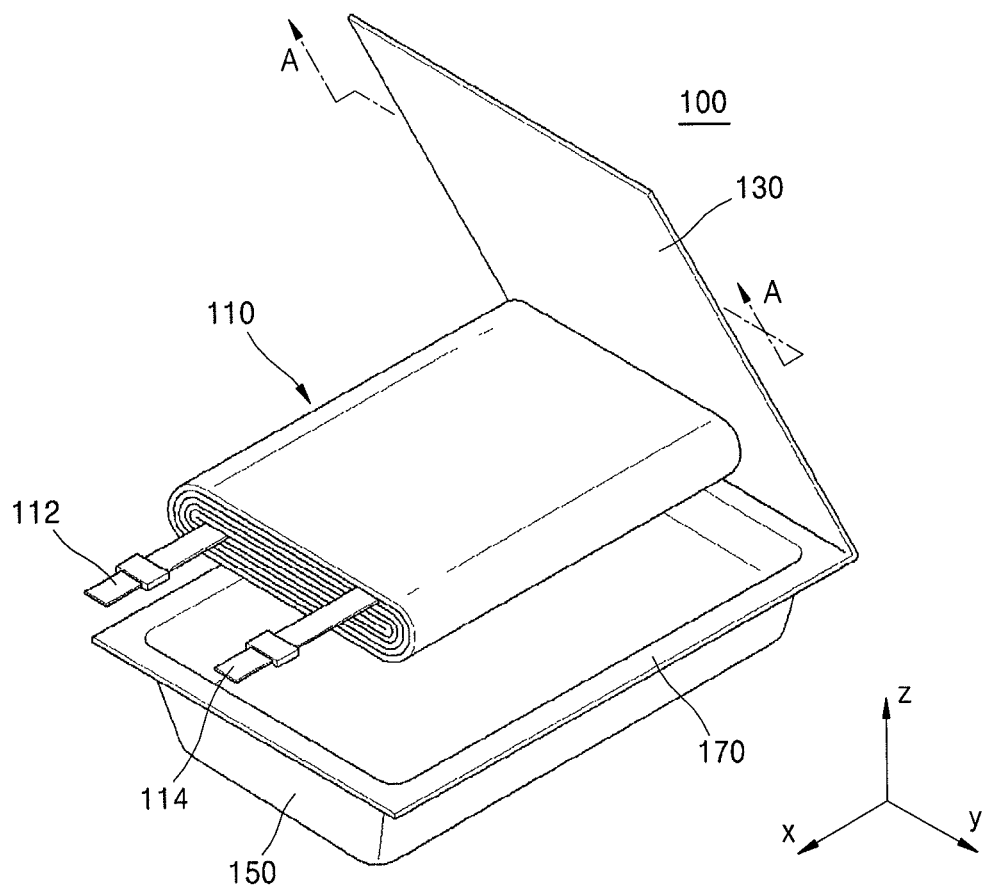
FIG. 1 illustrates a perspective view schematically depicting a flexible secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

Figure 2:
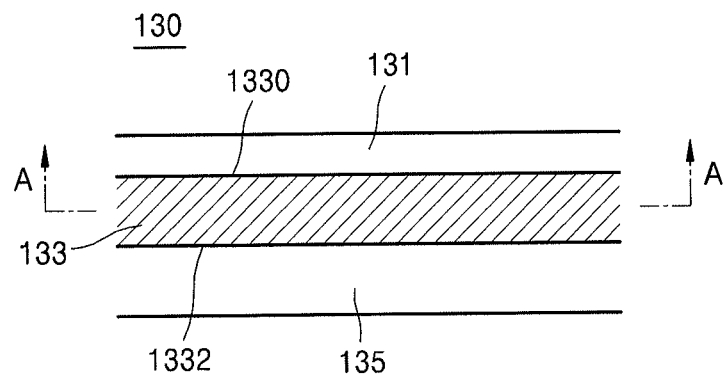
FIG. 2 illustrates a cross-sectional view schematically depicting an external cover.
Figure 3:
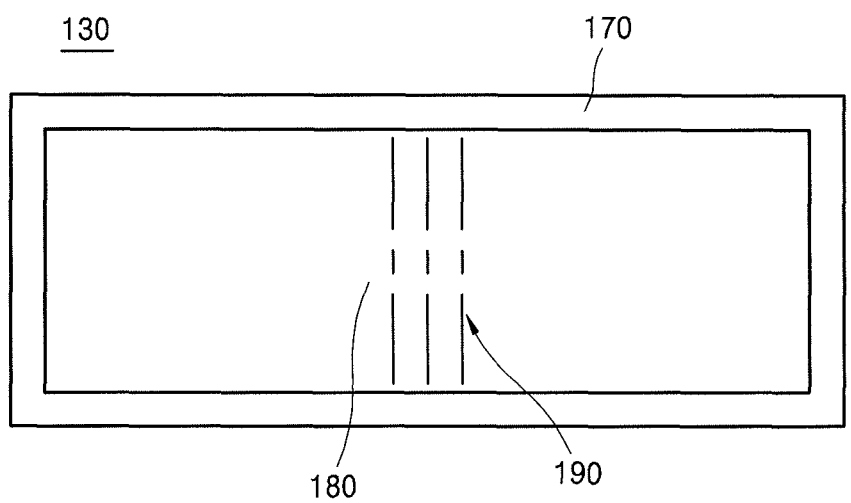
FIG. 3 illustrates a schematic view of an external cover according to an embodiment.

FIG. 1 illustrates a perspective view schematically depicting a flexible secondary battery 100 according to an embodiment, and FIG. 2 illustrates a cross-sectional view schematically depicting a cross-sectional view of an external cover taken along a line A-A of FIG. 1. FIG. 3 illustrates a schematic view of an outside portion of a first external cover according to an embodiment.

Referring to FIGS. 1 and 2, the flexible secondary battery 100 may include an electrode assembly 110, and a first external cover 130 and a second external cover 150 that seal the electrode assembly 110. Also, the flexible secondary battery 100 may include a sealing portion 170 where edges of the first external cover 130 and the second external cover 150 are attached to each other.

The electrode assembly 110 may be manufactured by stacking a cathode plate coated with a cathode active material, an anode plate coated with an anode active material, and a separator disposed between the cathode plate and the anode plate to prepare a stack, and rolling the stack into a jelly-roll type. In other implementations, the electrode assembly 110 may be prepared by sequentially and repeatedly stacking a cathode plate, a separator, and an anode plate.

The cathode plate may include a cathode active material part coated with a cathode active material and a cathode non-coated part. The cathode active material may be a lithium-containing transition metal oxide, such as $LiCoO_2$, $LiNiO_2$, $LiMnO_2$, or $LiMnO_4$, or a lithium chalcogenide compound.

The cathode active material part may be formed by coating the cathode active material on at least a portion of one surface of an aluminum plate. A remaining portion of the aluminum plate that is not coated with the cathode active material may constitute the cathode non-coated part.

The anode plate may include an anode active material part coated with an anode active material and an anode non-coated part that is not coated with the anode active material. The anode active material may be a carbon material, such as crystalline carbon, amorphous carbon, carbon complex, or carbon fibers, lithium metal, or a lithium alloy.

The anode active material part may be formed by coating the anode active material on at least a portion of one surface of a copper plate. A remaining portion of the copper plate that is not coated with the anode active material may constitute the anode non-coated part.

The separator may be prepared by coating a substrate with a poly(vinylidene fluoride-co-hexafluoropropene) (PVDF-HFP) co-polymer. The substrate may be selected from the group of polyethylene (PE), polystyrene (PS), polypropylene (PP), and a co-polymer of polyethylene (PE) and polypropylene (PP).

A first electrode tab 112 and a second electrode tab 114 may be attached to the electrode assembly 110. The first electrode tab 112 and the second electrode tab 114 may be attached to the cathode non-coated part and the anode non-coated part, respectively. The first electrode tab 112 and the second electrode tab 114 may extend to the outside through a sealing portion 170.

The first external cover 130 may be located on a first surface of the electrode assembly 110, and the second external cover 150 may be located on a second surface of the electrode assembly 110 to seal the electrode assembly 110 together with the first external cover 130. An electrolyte may be accommodated inside the flexible secondary battery 100.

The first external cover 130 and the second external cover 150 may have flexible properties. Penetration of external moisture or oxygen into the flexible secondary battery 100 may be prevented.

For example, as shown in FIG. 1, an accommodation space for accommodating the electrode assembly 110 may be formed in the second external cover 150, and the electrode assembly 110 may be accommodated in the accommodation space. The first external cover 130 may cover an upper part of the accommodation space. Edges of the first external cover 130 and the second external cover 150 may be fuse-bonded, and the electrode assembly 110 may be sealed. The sealing portion 170 may be formed at the edges of the first external cover 130 and the second external cover 150 by the fuse bonding. The sealing portion 170 may be flat.

As shown in FIG. 2, the first external cover 130 may have a three-layer structure formed of a first insulation layer 131, a metal layer 133, and a second insulation layer 135. The metal layer 133 may be formed, for example, of aluminum, steel, or stainless steel. The first insulation layer 131 and the second insulation layer 135 may be formed of casting polypropylene (CPP), polyethyleneterephthalate (PET), or nylon, as examples. The second external cover 150 may have the same three-layer structure as the first external cover 130.

At least one of the first external cover 130 and the second external cover 150 may include a stress-relief pattern 190 at a center portion 180 thereof.

When the flexible secondary battery 100 is bent and unbent, an outer surface of the flexible secondary battery 100 being bent may receive an expansion stress, and an inner surface of the flexible secondary battery 100 being bent may receive a contraction stress. Some parts may be more intensely stressed than others.

Stress may be focused at a portion that is far from the sealing portion 170, which is located at edges of the flexible secondary battery 100, during the bending and unbending of the flexible secondary battery 100, the center portion 180 may receive an intense stress when the flexible secondary battery 100 is bent.

Therefore, the center portion 180 of the first or second external cover 130 or 150 may include the stress-relief pattern 190 to prevent the first or second external cover 130 or 150 being torn or deformed due to repeatedly applied stimuli during the use of the flexible secondary battery 100.

As shown in FIG. 3, the stress-relief pattern 190 may be formed in the center portion 180.

As described above, the stress-relief pattern 190 provide wrinkles on an intensely stressed part to protect the flexible secondary battery 100 from being damaged. The sealing portion 170 at the edges of the flexible secondary battery 100 may be formed flat without including the stress-relief pattern 190.

In this regard, the center portion 180 that includes the stress-relief pattern 190 may be spaced apart from the sealing portion 170 by a predetermined distance.

As shown in FIG. 3, the stress-relief pattern 190 may include patterns that are formed with directivity in a direction perpendicular to a length direction of the flexible secondary battery 100.

When a comparative flexible secondary battery is repeatedly bent to have a curved shape and unbent, a first or second external cover of the comparative flexible secondary battery may be damaged or deformed.

In the flexible secondary battery 100 according to embodiments, on the other hand, the stress-relief pattern 190 may be formed of patterns having directivity in a direction perpendicular to the length direction as well as in a direction of wrinkles formed on the first or second external cover 130 or 150.

The stress-relief pattern 190 provides wrinkles on the first or second external cover 130 or 150 such that when the flexible secondary battery 100 is bent and opened, deformation of the flexible secondary battery 100 may be reduced.

The stress-relief pattern 190 may be included in the center portion 180. When the flexible secondary battery 100 is bent to have a curved shape, a shape of the stress-relief pattern 190 may change to induce the formation of wrinkles.

The stress-relief pattern 190 may be included in the center portion 180, and wrinkles may be formed on the external cover 130 or 150 by the stress-relief pattern 190 when the flexible secondary battery 100 is bent to have a curved shape. The stress on the external cover 130 or 150 may be reduced, and damage to or deformation of the flexible secondary battery 100 may be reduced or prevented.

In an exemplary embodiment, the flexible secondary battery 100 may be bendable in a direction of the first external cover 130 that serves as a cover of the second external cover 150, where the accommodation space is formed. Edges of two parallel sides of the flexible secondary battery 100 may move toward an upper part of the first external cover 130 such that the first external cover 130 may be bent concavely.

In this case, the first external cover 130 may receive a contraction stress, and the second external cover 150 located on the opposite surface may receive an expansion stress. The stress-relief pattern 190 may be included in the first external cover 130 that receives the contraction stress.

When the stress-relief pattern 190 is included in the first external cover 130, wrinkles may be formed on the first external cover 130 by the stress-relief pattern 190 when the flexible secondary battery 100 is bent toward an upper part of the first external cover 130, and thus the flexible secondary battery 100 may receive a reduced contraction stress.

In other implementations, the stress-relief pattern 190 may be included in the second external cover 150.

The stress-relief pattern 190 may be included in the first external cover 130 or the second external cover 150 or in both the first external cover 130 and the second external cover 150.

According to another embodiment, when edges of two parallel sides of the flexible secondary battery 100 move toward a lower part of the second external cover 150 such that the second external cover 150 is bent concavely, the second external cover 150 may receive a contraction stress. Thus, the stress-relief pattern 190 may be included in the second external cover 150.

The stress-relief pattern 190 may be formed in the metal layer 133 (see FIG. 2) in a structure of the first external cover 130.

The metal layer 133 may be formed of a metal material, such as aluminum or an alloy including aluminum. Aluminum is malleable and ductile, has excellent machinability, and may not easily burst compared to other metals.

In order to provide the stress-relief pattern 190 in the metal layer 133, the metal layer 133 may be formed of a metal material, such as aluminum or an aluminum alloy.

As shown in FIG. 2, an interface between the metal layer 133 and the first insulation layer 131 may be a first surface 1330, and an interface between the metal layer 133 and the second insulation layer 135 may be a second surface 1332. The stress-relief pattern 190 may be provided in at least one of the first surface 1330 and the second surface 1332.

The first insulation layer 131 may be an outermost layer of the first external cover 130, and thus the first surface 1330 may be a surface that is located on an outermost side of the metal layer 133.

The second insulation layer 135 may be an innermost layer of the first external cover 130, and thus the second surface 1332 may be a surface that is located on a side of the metal layer 133 facing the electrode assembly 110.

When the flexible secondary battery 100 is bent, the first or second external cover 130 or 150 that is located at a bent side of the flexible secondary battery 100 may receive a contraction stress, and an outermost surface from the first or second external cover 130 or 150 may receive the largest contraction stress.

The stress-relief pattern 190 may be provided in the first surface 1330. In other implementations, the stress-relief pattern may be provided in the second surface 1332 or may be provided in both the first surface 1330 and the second surface 1332.

Figure 4:
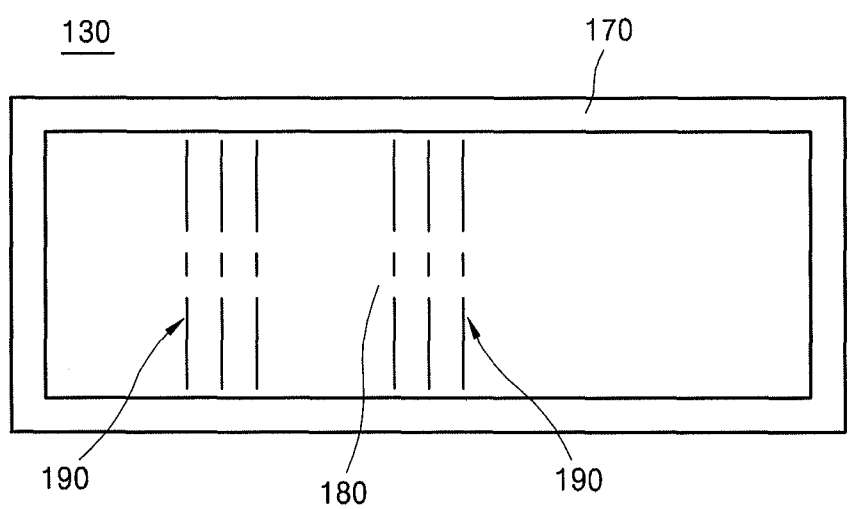
FIG. 4 illustrates a schematic view of an external cover according to another embodiment.
Figure 5:
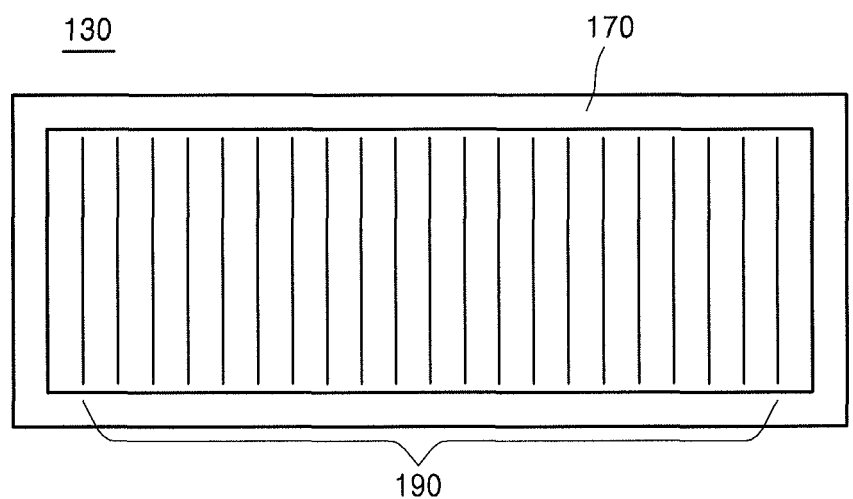
FIG. 5 illustrates a schematic view of an external cover according to another embodiment.

FIGS. 4 and 5 illustrate schematic views of the first external cover 130 of the flexible secondary battery 100 according to another embodiment.

FIG. 4 illustrates an embodiment of the first external cover 130 that includes the center portion 180. The stress-relief pattern 190 may be additionally included in a region other than the center portion 180. FIG. 5 illustrates an embodiment of the first external cover 130 that includes the stress-relief pattern 190 in the whole of the first external cover 130 except the sealing portion 170.

As shown in FIGS. 4 and 5, the stress-relief pattern 190 may be additionally included in a part of the first or second external cover 130 or 150 other than the center portion 180 as well as in the center portion 180.

That is, as shown in FIG. 4, patterns having directivity in a direction perpendicular to a length direction of the flexible secondary battery 100 may be formed on at least one side of the stress-relief pattern 190 included in the center portion 180 in the length direction of the flexible secondary battery 100.

The sealing portion 170 may be flat. The remaining region of the first or second external cover 130 or 150 other than a region of the sealing portion 170 may additionally include the stress-relief pattern 190.

In the process of bending and unbending the flexible secondary battery 100, an amount of stress received by the first or second external cover 130 or 150 may increase in a direction away from the edges of the flexible secondary battery 100. The amount of stress may have a maximum value at the center portion 180, but the remaining regions of the first or second external cover 130 or 150 other than the region of the center portion 180 may also receive a small amount of stress as well.

In order to efficiently reduce the amount of stress by forming wrinkles on several regions of the first or second external cover 130 or 150, the stress-relief pattern 190 may be additionally provided in regions other than the region of the sealing portion 170 as well as the region of the center portion 180 of the first or second external cover 130 or 150.

The stress-relief pattern 190 may be additionally provided in regions other than the region of the center portion 180. For example, as shown in FIG. 5, the stress-relief pattern 190 may be provided over the whole of the remaining region of the first or second external cover 130 or 150.

In this case, only the sealing portion 170 may be flat among the first or second external cover 130 or 150. The stress-relief pattern 190 may be provided in the remaining regions other than the region of the sealing portion 170. Thus, inducing formation of wrinkles while bending and unbending the flexible secondary battery 100 may be much easier when the stress-relief pattern 190 is provided over the whole of the first or second external cover 130 or 150 except the region of the sealing portion 170 than when the stress-relief pattern 190 is included in a smaller region of the first or second external cover 130 or 150.

Even when an operation of bending the flexible secondary battery is repeated, a contraction stress received by the first or second external cover 130 or 150 may be efficiently removed. The risk of deformation of or damage to the first or second external cover 130 or 150 of the flexible secondary battery 100 may be reduced.

As shown in FIGS. 3 through 5, the stress-relief pattern 190 may be formed in a direction perpendicular to a direction in which the first or second external cover 130 or 150 is bent.

The first or second external cover 130 or 150 may be bent in a direction of an upper part of the first external cover 130 or a lower part of the second external cover 150. For example, a direction in which the flexible secondary battery 100 is bent and unbent, or a bending direction, may be simply an upward or downward direction of the flexible secondary battery 100.

A part receiving a contraction stress within the first or second external cover 130 or 150, for example, a part that is concavely bent inward when the flexible secondary battery 100 has a curved shape, may be deformed in a direction perpendicular to the upward or downward direction.

The stress-relief pattern 190 included in the flexible secondary battery 100 to induce formation of wrinkles may be formed of a plurality of patterns having directivity that is perpendicular to a bending direction of the flexible secondary battery 100.

The plurality of patterns may have directivity that is perpendicular to a bending direction of the flexible secondary battery 100. Thus, wrinkles may be easily formed on the first or second external cover 130 or 150 such that damage to the external cover 130 or 150 caused by bending and unbending of the battery may be reduced.

A shape of the plurality of patterns is not limited, and any shape suitable for inducing formation of wrinkles on the external cover 130 or 150 may be used. The plurality of patterns may be formed in the form of wrinkles having directivity that is perpendicular to a bending direction of the battery. When the plurality of patterns are formed in a form of wrinkles having the same shape as a shape into which the external material deforms, the wrinkles may be more efficiently induced on the external material than when formed having other kinds of shapes.

Figure 6:
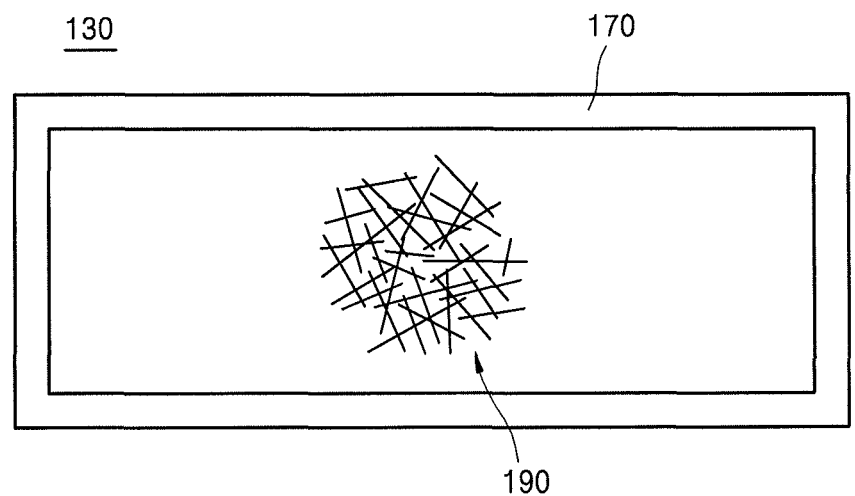
FIG. 6 illustrates a schematic view of a flexible secondary battery including an irregular stress-relief pattern, according to another embodiment.

FIG. 6 illustrates a schematic view of a flexible secondary battery according to another embodiment.

As shown in FIG. 6, according to this embodiment, the stress-relief pattern 190 may be formed of a plurality of patterns that are formed irregularly.

Even if the plurality of patterns do not have a predetermined directivity or regularity, formation of wrinkles may be induced the material of external cover when a battery has a curved shape.

The plurality of patterns in such irregular forms may well induce wrinkles in any form to the external material.

By way of summation and review, wearable computer technology and its applications using a secondary battery as a power source have been developed and commercialized, and electronic devices, such as cell phones and laptop computers, are designed to be curved for a more ergonomic design.

As industries related to portable electronic devices grow, demand for a battery appropriate to power the portable electronic devices has increased. Flexibility of the device itself in relation to durability with respect to use, carriage, storage, and impact safety of the portable electronic devices is desirable. Therefore, flexibility of a battery is desirable as well.

According to the one or more of the above embodiments, damage or deformation of a flexible secondary battery may be minimized even after repeated bending.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A flexible secondary battery, comprising:
an electrode assembly;
a first external cover that is located on a first surface of the electrode assembly; and
a second external cover that is located on a second surface of the electrode assembly, the second external cover and the first external cover being connected to each other by a hinge side, and the second external cover and the first external cover including a sealing portion where edges of the first external cover and the second external cover are attached to each other to seal the electrode assembly,
wherein at least one of the first external cover and the second external cover has a three-layer structure formed of a first insulation layer, a second insulation layer, and a metal layer between the first insulation layer and the second insulation layer, the at least one of the first external cover and the second external cover including a stress-relief pattern in the metal layer of the at least one of the first external cover and the second external cover, the stress-relief pattern extending across the at least one of the first external cover and the second external cover in a center portion, the stress-relief pattern including patterns in a form of wrinkles that relieve a compression stress or an expansion stress when the at least one of the first external cover and the second external cover of the flexible secondary battery is bent concavely or convexly, the stress-relief pattern extending in a direction perpendicular to a length direction of the flexible secondary battery and parallel to the hinge side connecting the first and second external covers.

2. The flexible secondary battery as claimed in claim 1, wherein the center portion is spaced apart from the sealing portion.

3. The flexible secondary battery as claimed in claim 2, wherein a shape of the stress-relief pattern changes when the flexible secondary battery is bent.

4. The flexible secondary battery as claimed in claim 1, wherein the sealing portion is flat.

5. The flexible secondary battery as claimed in claim 1, wherein:
the first external cover is concavely bendable, and the stress-relief pattern is located in the center portion of the first external cover.

6. The flexible secondary battery as claimed in claim 1, wherein at least one of the first external cover and the second external cover further includes patterns on at least one side of the stress-relief pattern in the length direction of the flexible secondary battery.

7. The flexible secondary battery as claimed in claim 1, wherein the stress-relief pattern is located in an xy-plane that is perpendicular to a z-axis toward which the flexible secondary battery is bendable.

8. The flexible secondary battery as claimed in claim 1, wherein the stress-relief pattern includes irregular patterns.

9. A flexible secondary battery, comprising:
an electrode assembly;
a first external cover that is located on a first surface of the electrode assembly, the first external cover including a three-layer structure formed of a first insulation layer, a second insulation layer, and a metal layer between the first insulation layer and the second insulation layer; and a second external cover that is located on a second surface of the electrode assembly, the second external cover and the first external cover being connected to each other by a hinge side, and the second external cover and the first external cover including a sealing portion where edges of the first external cover and the second external cover are attached to each other to seal the electrode assembly, the sealing portion being flat, wherein the metal layer of the first external cover includes a stress-relief pattern extending across the first external cover in a center portion thereof, the stress-relief pattern including patterns in a form of wrinkles that relieve a compression stress or an expansion stress when the first external cover of flexible secondary battery is bent concavely or convexly, the stress-relief pattern extending in a direction perpendicular to a length direction of the flexible secondary battery.

10. The flexible secondary battery as claimed in claim 9, wherein the center portion is spaced apart from the sealing portion.

11. The flexible secondary battery as claimed in claim 9, wherein a shape of the stress relief stress-relief pattern changes when the flexible secondary battery is curved.

12. The flexible secondary battery as claimed in claim 9, wherein the first external cover further includes patterns on at least one side of the stress-relief pattern in the length direction of the flexible secondary battery.

13. The flexible secondary battery as claimed in claim 9, wherein the stress-relief pattern is located in an xy-plane that is perpendicular to a z-axis toward which the flexible secondary battery is bent.

14. The flexible secondary battery as claimed in claim 9, wherein the stress-relief pattern includes irregular patterns.

15. The flexible secondary battery as claimed in claim 1, wherein the metal layer is aluminum or an aluminum alloy.

16. The flexible secondary battery as claimed in claim 9, wherein the metal layer is aluminum or an aluminum alloy.

* * * * *